(12) United States Patent
Lefebvre et al.

(10) Patent No.: US 9,696,143 B2
(45) Date of Patent: Jul. 4, 2017

(54) DEVICE FOR OPTICAL PROFILOMETRY WITH CONICAL LIGHT BEAMS

(71) Applicant: INSTITUT NATIONAL D'OPTIQUE, Québec (CA)

(72) Inventors: Daniel Lefebvre, Québec (CA); Éric Samson, Québec (CA); Michel Doucet, Saint-Augustin-de-Desmaures (CA); Sébastien Roy, Québec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 14/974,011

(22) Filed: Dec. 18, 2015

(65) Prior Publication Data
US 2016/0178356 A1 Jun. 23, 2016

Related U.S. Application Data (60) Provisional application No. 62/094,225, filed on Dec. 19, 2014.

(51) Int. Cl.
G01B 11/24 (2006.01)
G01B 11/12 (2006.01)

(52) U.S. Cl.
CPC .............. *G01B 11/24* (2013.01); *G01B 11/12* (2013.01)

(58) Field of Classification Search
CPC ....... G01B 11/24; G01B 11/024; G01B 11/12; G01B 11/2518; G01J 3/0256; G01J 3/0208; G01J 3/0224; G01J 3/0272; G01J 3/10; G01J 3/44; G01J 3/50; G01J 3/501; G01J 3/524; G01J 4/00; G01J 1/04
See application file for complete search history.

(56) References Cited

U.S. PATENT DOCUMENTS

| | | |
|---|---|---|
| 4,725,883 A | 2/1988 | Clark, Jr. et al. |
| 4,967,092 A | 10/1990 | Fraignier et al. |
| 5,895,927 A | 4/1999 | Brown |
| 5,933,231 A | 8/1999 | Bieman et al. |
| 6,243,657 B1 | 6/2001 | Tuck et al. |
| 7,046,356 B2 | 5/2006 | Bondurant |
| 7,164,476 B2 | 1/2007 | Shima et al. |
| 7,612,878 B2 | 11/2009 | Frey |

(Continued)

FOREIGN PATENT DOCUMENTS

WO 0010047 A1 2/2000

OTHER PUBLICATIONS

P. De Ruvo et al., "An omnidirectional range sensor for environmental 3-D reconstruction", 2010 IEEE International Symposium on Industrial electronics (ISIE), Jul. 4-7, 2010, pp. 396-401, IEEE, Bari (Italy).

*Primary Examiner* — Michael P Stafira
(74) *Attorney, Agent, or Firm* — Fasken Martineau DuMoulin LLP (57) ABSTRACT

There is described an optical system for sensing the surface of an object. The system comprises: a light source for emitting at least one light beam centered on the optical axis of the system; a light reflector for reflecting the at least one incident light beam to generate at least two hollow conical light beams centered on the optical axis and having different opening angles, the at least two reflected hollow conical light beams for illuminating the surface; and an image capture device for imaging the illuminated surface.

14 Claims, 8 Drawing Sheets

(56) References Cited

U.S. PATENT DOCUMENTS

| | | |
|---|---|---|
| 7,903,245 B2 | 3/2011 | Miousset et al. |
| 8,334,971 B2 | 12/2012 | Keller et al. |
| 2015/0157194 A1* | 6/2015 | Okuda ............... G02B 23/2446 600/109 |

* cited by examiner

DEVICE FOR OPTICAL PROFILOMETRY WITH CONICAL LIGHT BEAMS

TECHNICAL FIELD

The present invention relates to the field of profilometers, and more particularly to optical profilometers.

BACKGROUND

Various technologies can be used to perform measurements on a surface or determine the three-dimensional (3D) profile of a surface such as the inner wall of a tubular body. For example, some mechanical devices use a contact probe to measure the position of a surface. Such mechanical devices may not be adequate for measuring surfaces made of soft materials due to the deformation caused by the pressure exerted by the contact probe. In another example, some non-contact devices, based on optical principles, use a single beam of light projected perpendicularly to their moving direction inside of a tubular body. Such non-contact devices rely on an external high precision positioning to correctly use the measurements in a 3-D space. While it is efficient in terms of precision of the measurements, the optical configuration mentioned above does not offer the possibility of inspecting the surface located beyond the current position of the device.

Therefore, there is a need for an improved system for determining the profile of a surface.

SUMMARY

There is described a profilometer adapted to emit at least two beams of light each having the shape of a hollow cone for sensing a surface of an object located adjacent to the profilometer. The object may be a pipe or duct in which the profilometer is positioned in order to determine the profile of the internal surface of the pipe or duct. The profilometer is adapted to determine the distance between points of the surface of the surrounding object and the optical axis of the profilometer over an azimuth of 360° about the optical axis. The conical light beams propagate away from the optical axis of the profilometer according to different opening angles. Therefore, different portions of the object surrounding the profilometer may be scanned concurrently.

According to a broad aspect, there is provided a system for sensing a surface of an object, comprising: a light source for emitting at least one incident light beam centered on an optical axis of the system; a light reflector for reflecting the at least one incident light beam to generate at least two reflected hollow conical light beams centered on the optical axis and having different opening angles, the at least two hollow conical light beams for illuminating the surface; and an image capture device for imaging the illuminated surface.

In one embodiment, the at least one incident light beam comprises at least two incident hollow conical light beams.

In one embodiment, the light source comprises at least two light emitters each for emitting a respective one of the at least two incident hollow conical light beams.

In one embodiment, the at least two light emitters are aligned and spaced apart one another along the optical axis of the system.

In one embodiment, the at least two light emitters are adapted to emit incident light beams having different wavelengths.

In another embodiment, the light source comprises a laser and a diffractive optical element for generating the at least two reflected hollow conical light beams.

In a further embodiment, the light source comprises a light emitter that emits an incoherent light beam and an opaque mask containing at least two annular apertures for generating the at least two incident hollow conical light beams.

In one embodiment, the light reflector comprises a mirror having a reflecting face, the reflecting face for reflecting the at least two incident hollow conical light beams and thereby generating the at least two reflected hollow conical light beams.

In one embodiment, the mirror has one of a conical shape, a hemi-spherical shape, and a hemi-ellipsoidal shape.

In one embodiment, the mirror is made of optical glass coated with a reflecting material.

In another embodiment, the at least one incident light beam comprises a solid conical light beam.

In one embodiment, the light source comprises a laser and a pinhole for generating the solid conical light beam.

In one embodiment, the light reflector comprises a mirror having a lateral face, the lateral face being provided with at least two annular reflecting surfaces each for reflecting a respective portion of the solid conical light beam and thereby generating the at least two reflected hollow conical light beams.

In one embodiment, the image capture device comprises a complementary metal-oxide-semiconductor (CMOS) image sensor and a fish-eye lens.

In one embodiment, the system further comprises an optical band-pass filter located in front of the image capture device for filtering ambient light.

In one embodiment, the system further comprises a computing module connected to the image capture device, the computing module comprising a processing unit and a memory coupled to the processing unit, and the memory comprising statements and instructions stored thereon that, when executed by the processing unit, perform a determination of a distance between the optical axis and the illuminated surface, the distance being determined using a triangulation method.

In one embodiment, the light source is located between the image capture device and the light reflector along the optical axis of the system.

In one embodiment, the system further comprises a motorized platform for moving the system.

BRIEF DESCRIPTION OF THE DRAWINGS

Having thus generally described the nature of the invention, reference will now be made to the accompanying drawings, showing by way of illustration an example embodiment thereof and in which.

It will be noted that throughout the appended drawings, like features are identified by like reference numerals.

DETAILED DESCRIPTION

Figure 1:
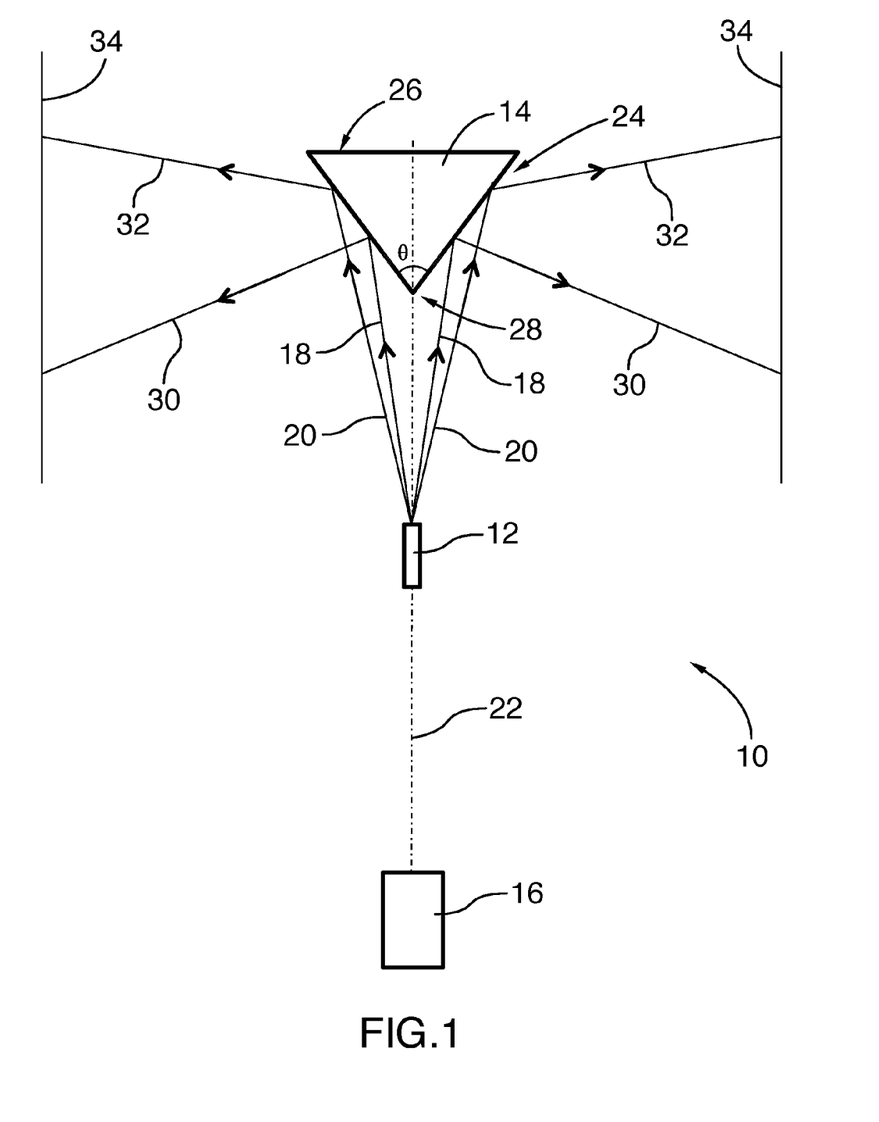
FIG. 1 illustrates a profilometer comprising a conical light reflector for emitting hollow conical light beams, in accordance with a first embodiment.

FIG. 1 illustrates one embodiment of an optical profilometer 10 for determining the profile of at least a portion of the surface 34 of an object positioned adjacent to and on the lateral sides of the profilometer 10. The profilometer 10 comprises at least a light source 12, a light reflector 14, and an image capture device 16.

The light source 12 is adapted to emit at least two annular light beams 18 and 20 each having its center propagation axis coincident with the optical axis 22 of the profilometer 10. The cross-section of the light beam 18, 20 in a plane orthogonal to the optical axis 22 is preferably circular. It should be understood that the cross-section of the light beam 18, 20 in a plane orthogonal to the optical axis 22 may have a shape other than circular, such as ellipsoidal. While propagating away from the light source 12, the radius of the annular light beam 18, 20, i.e. the radial distance between the light beam 18, 20 and the optical axis 22, increases with a rate determined by the value of an opening angle. The light beams 18 and 20 are thus both divergent and provided with a hollow conical shape that is centered on the optical axis 22 and of which the origin is located on the light source 12. The hollow conical shape is also characterized by its opening angle. The light beams 18 and 20 are said to have a hollow conical shape and are referred to as hollow conical light beams hereinafter. As shown in FIG. 1, the light beams 18 and 20 also have different opening angles.

The light reflector 14 comprises at least one lateral reflecting surface 24 having a conical shape characterized by a base 26 and an apex or origin 28, the latter being located on the axis of symmetry of the shape. The reflecting surface 24 is adapted to at least partially reflect light having the same wavelength as that of the light emitted by the light source 12. In the present embodiment, the reflector 14 is a mirror having a rotationally-symmetric conical shape. The reflector 14 is positioned so that its apex 28 faces the light source 12 while its symmetry axis coincides with the optical axis 22 of the profilometer 10. The distance between the light source 12 and the reflector 14 and the opening angles of the light beams 18 and 20 are chosen so that the light beams 18 and 20 be incident on the reflecting surface 24 of the reflector 14.

Figure 2:
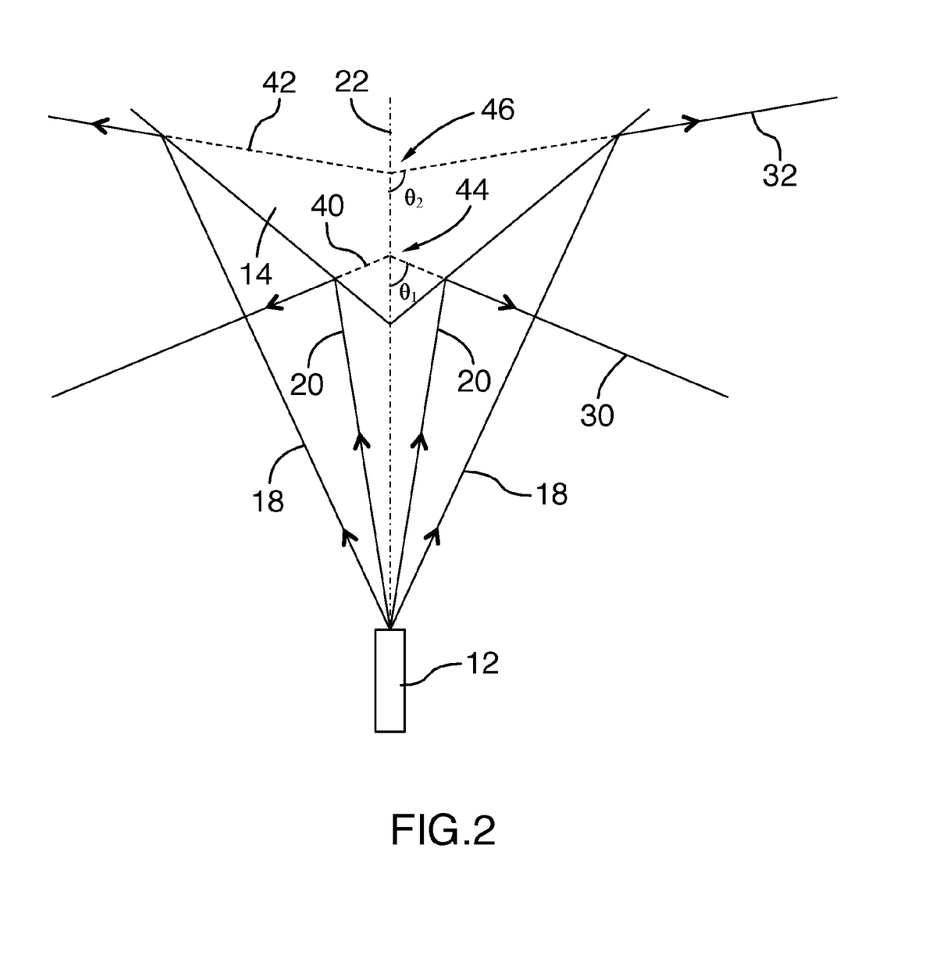
FIG. 2 schematically illustrates the generation of the hollow conical light beams of FIG. 1 by the conical light reflector, in accordance with an embodiment.

As illustrated in FIG. 2, the light beams 18 and 20 each propagate up to the reflecting surface 24 and two different annular sections of the reflecting surface 24 reflect at least partially a respective one of the light beams 18 and 20 according to different reflection angles relative to the optical axis 22, thereby generating the reflected light beams 30 and 32, respectively. The reflection angle $\theta_1$ for the light beam 30 corresponds to the angle of a cone 40 that superimposes on the light beam 30 and may be referred to as the opening angle of the conical light beam 30. Likewise, the reflection angle $\theta_2$ for the light beam 32 corresponds to the angle of a cone 42 that superimposes on the light beam 32 and may be referred to as the opening angle of the conical light beam 32. The origins or apexes 44 and 46 of the cones 40 and 42, respectively, are positioned on the optical axis 22 at different locations therealong. The values of the opening angles $\theta_1$ and $\theta_2$ are different so that the reflected light beams 30 and 32 propagate along different directions relative to the optical axis 22. It should be understood that the opening angle of the conical light beam 18, 20 and the apex angle $\theta$ of the conical reflector 14 (see FIG. 1) are chosen so as to obtain a desired reflection angle $\theta_1$, $\theta_2$ for the reflected light beam 30, 32.

In one embodiment, the hollow conical light beam 30, 32 is said to propagate in the forward direction (i.e. towards the top of FIG. 2) when the reflection angle $\theta_1$, $\theta_2$ is equal to or greater than 90° but less than 180°, and the hollow conical light beam 30, 32 is said to propagate in the backward direction when the reflection angle $\theta_1$, $\theta_2$ is less than 90° but greater than 0°. Here, the value of the reflection angle may vary from 0° to 180° and it increases counterclockwise.

Since the cross-section of the reflector 14 is circular, each one of the reflected light beams 30 and 32 has a frusto-conical shape of which the cross-section is circular. In the illustrated embodiment, the reflected light beam 30 propagates in the backward direction, i.e. the angle $\theta_1$ is less than 90° while the reflected light beam 32 propagates in the forward direction, i.e. the angle $\theta_2$ exceeds 90°.

Referring back to FIG. 1, each of the reflected light beams 30 and 32 propagates up to the surface 34 of the object adjacent to the profilometer 10 and illuminate a respective portion/line of the surface 34. The image capture device 16 is positioned and adapted to image the portions of the surface 34 of the surrounding object that are illuminated by the reflected light beams 30 and 32. The image capture device 16 is further positioned so that the light source 12 be located between the image capture device 16 and the reflector 14.

The image capture device 16 is connected to a computing module (not shown) that receives the images of the illuminated surface captured by the image capture device 16. The computing module comprises a processing unit and a memory connected to the processing unit. The memory stores statements and instructions that, when executed by the processing unit, perform a determination of the distance between the optical axis 22 and each point of the surface 34 that is illuminated by a respective light beam 30, 32, as described below. Since the origins 44 and 46 of the cones 40 and 42 (see FIG. 2) that superimpose on the frusto-conical light beams 30 and 32, respectively, and the center of the image capture device 16 are located at different positions, a parallax is created which allows for determining the distance between the optical axis 22 and the points illuminated by the reflected light beams 30 and 32 using a triangulation method. By moving the profilometer 10 along a given portion of the surface 34, it is possible to determine the distance between the surface 34 and the optical axis 22 for substantially all of the points of the surface 34 contained in the given portion. The two-dimensional (2D) profile of the illuminated lines of the surface 34 can then be determined from the determined distance between the surface 34 and the optical axis 22. By moving the profilometer 10 relative to the surface 34 or vice-versa, it is possible to determine the 3D profile of the surface 34.

It should be understood that any adequate light source 12 adapted to emit at least two annular and concentric light beams 18 and 20 having different opening angles may be used. In one embodiment, the light source 12 may be adapted to emit incoherent light. For example, an incoherent light beam may illuminate an opaque mask containing annular apertures in order to generate at least two annular light beams. An imaging lens may then convert the annular light beams coming from the opaque mask into two or more conical light beams. In another embodiment, the light source 12 is adapted to emit coherent light. For example, the light source 12 may comprise a laser adapted to emit a first light beam that propagates along the optical axis 22 and a diffractive optical element adapted to convert the first light beam into at least two annular light beams 18 and 20 which form a structured light. For example, the diffractive optical element may be the DE-R 259 standard diffractive optical element from HOLOEYE Photonics AG (Berlin, Germany). It should be understood that the light source 12 may emit light having any adequate wavelength that may be reflected by the reflector 14 and detectable by the image capture device 16. For example, the light source 12 may emit visible light. In another example, the light source 12 may emit infrared light.

In an embodiment in which the light source 12 comprises a laser coupled to a diffractive optical element, the reflector 14 is located sufficiently far from the diffractive optical element so that at least two rings of light constituting a light pattern may be generated to illuminate the reflector 14. In an embodiment in which the laser and the diffractive optical element operate in the visible portion of the optical spectrum, a separation of about 10 cm between the laser and the reflector 14 may be sufficient for generating the light pattern. The overall length of the profilometer 10 may be adjusted in order to obtain an adequate parallax for the triangulation, amongst other factors. For radial distance measurements of the order of about 1 m, the image capture device 16 and the reflector 14 may be spaced apart by about 15 cm to about 20 cm. This distance may also be modulated according to a required resolution.

In one embodiment, the reflector 14 is made of optical glass coated with a reflecting material, i.e. a material having an adequate reflectivity for at least partially reflecting light at the emission wavelength of the light source 12. Aluminum, gold, or silver are examples of adequate materials for coating a reflector 14 made of optical glass. In another embodiment, the reflector 14 may be entirely made of a reflecting material.

In one embodiment, the diffractive optical element is adapted to generate at least two hollow conical light beams 18 and 20 of which the opening angle of each light beam is comprised between about 25° and 35°.

In one embodiment, an optical filter such as an optical band-pass filter is positioned along the optical axis 22 between the image capture device 16 and the light source 12, preferably in front of the image capture device 16. The optical filter is adapted to filter the light incident thereon so that only light having substantially the same wavelength as the wavelength of the light beams 30 and 32 may propagate therethrough and reach the image capture device 16. For example, the filter may be used to block ambient light while allowing the light emitted by the light source 12 and reflected by the surface 34 to reach the image capture device 16 and thereby be detected.

It should be understood that the reflector 14 is adapted to reflect at least partially light having the same wavelength as that of the light emitted by the light source 12. In one embodiment, the reflector 14 is a mirror adapted to reflect substantially the whole light incident thereon.

It should be understood that any adequate image capture device 16 adapted to image the illuminated portions of the surface 34 may be used. For example, the image capture device 16 may be embodied by a camera having a wide field of view. For example, the camera may comprise a complementary metal-oxide-semiconductor (CMOS) image sensor and a fish-eye objective lens. The CMOS image sensor may have a resolution of about 1000×1000 pixels for example.

In one embodiment, the light beams 18 and 20 have substantially the same wavelength such as in the embodiment illustrated in FIG. 1. In another embodiment, the light source 12 is adapted to emit at least two light beams 18 and 20 each having a different wavelength. For example the light source 12 may comprise a first light emitter adapted to emit light at a first wavelength and a second light emitter adapted to emit light at a second and different wavelength, as illustrated in FIG. 3.

Figure 3:
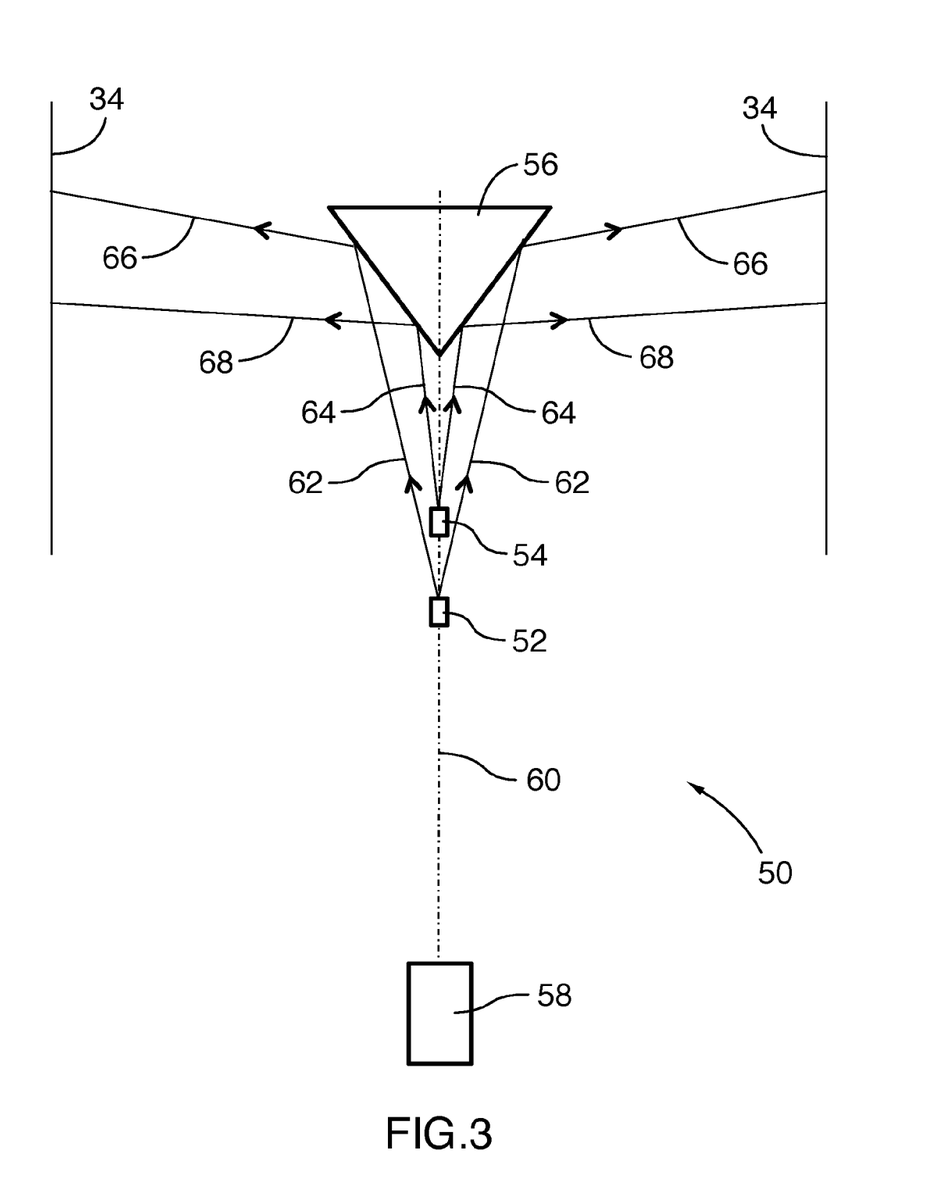
FIG. 3 illustrates a profilometer comprising a conical light reflector for emitting hollow conical light beams, in accordance with a second embodiment.

FIG. 3 illustrates a profilometer 50 which comprises a first light source 52 adapted to emit light having a first wavelength, a second light source 54 adapted to emit light having a second and different wavelength, a conical reflector 56 adapted to reflect at least partially light having the first wavelength or the second wavelength, and an image capture device 58. The light sources 52 and 54, and the reflector 56 are centered on the optical axis 60 so that the hollow conical light beams 66 and 68 reflected by the reflector 56 be centered on the optical axis 60. Optionally, the image capture device 58 may also be centered on the optical axis 60. The first light source 52 is adapted to emit a first annular and divergent light beam 62, i.e. the hollow conical light beam 62 that propagates towards the reflector 56. The second light source 54 is adapted to emit a second annular and divergent light beam 64, i.e. the hollow conical light beam 64 that also propagates towards the reflector 56. As illustrated in FIG. 3, the second light source 54 is positioned between the first light source 52 and the reflector 56, within the hollow conical light beam 62 generated by the first light source 52 so that it does not block the light beam 62.

The hollow conical light beams 62 and 64 are each reflected by a respective annular section of the reflector 56, thereby obtaining the reflected hollow conical light beams 66 and 68 respectively that propagate along different directions relative to the optical axis 60. These directions are determined from the opening angles of the light beams 62 and 64, the distances between the apex of the reflector 56 and the light sources 52 and 54, and from the angle of the reflector 56.

The reflected hollow conical light beams 66 and 68 each illuminate a respective annular section or line of the surface 34 of the object adjacent to the profilometer 50. The image capture device 58 is adapted to detect light having the first wavelength and emitted by the first light source 52, and light having the second wavelength and emitted by the second light source 54. The image capture device 58 then images the portions of the surface 34 that are illuminated by the reflected light beams 66 and 68. The 3D profile of the surface 34 can then be determined from the distances measured between the surface 34 and the optical axis 60.

Figure 4:
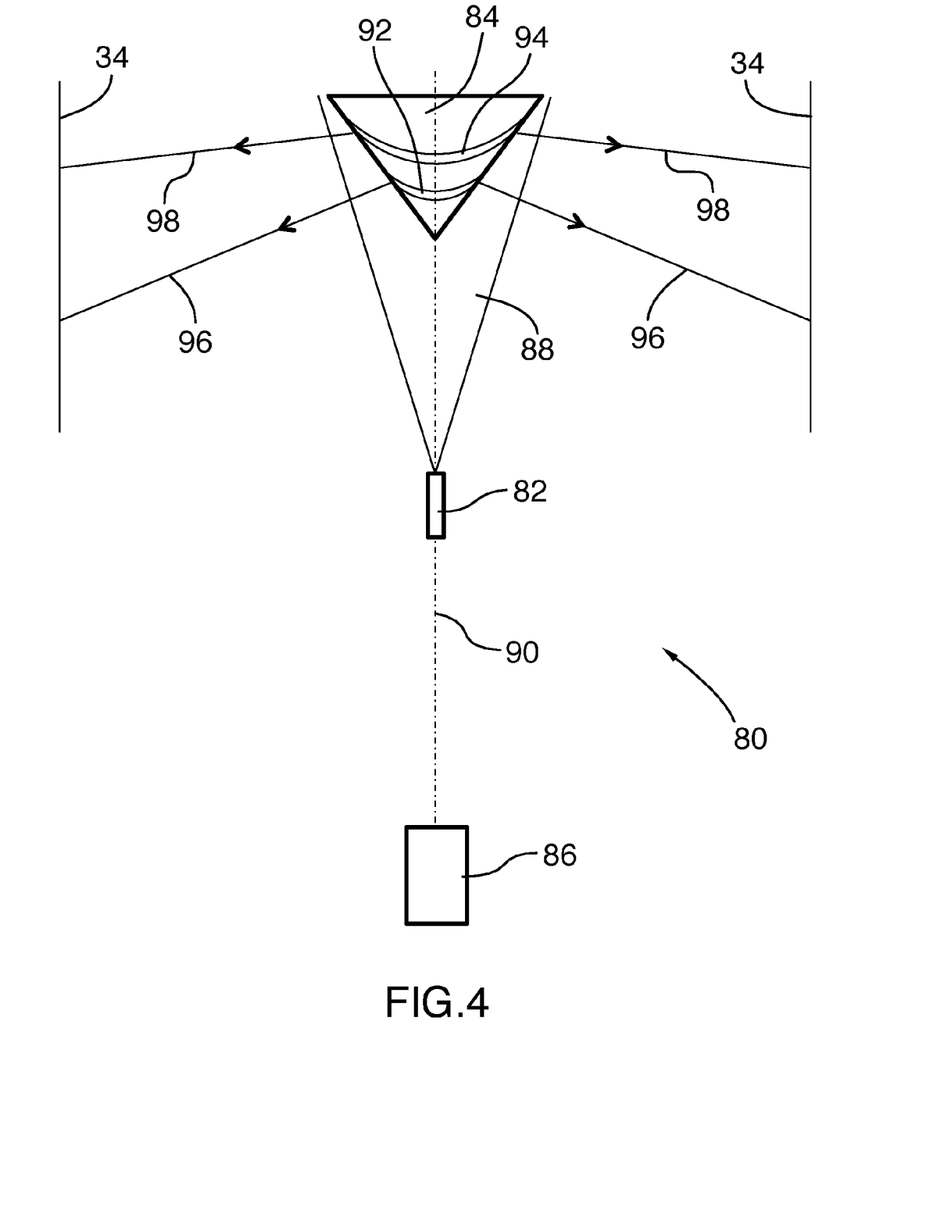
FIG. 4 illustrates a profilometer comprising a conical light reflector for emitting hollow conical light beams, in accordance with a third embodiment.

While in the embodiment illustrated in FIG. 1 the whole surface 24 of the reflector 14 is made of a light reflecting material, it should be understood that other embodiments may be possible. For example, FIG. 4 illustrates one embodiment of a profilometer 80 that comprises a light source 82, a conical reflector 84 of which only annular sections are made of a reflecting material, and an image capture device 86. The light source 82 is adapted to emit a solid conical light beam 88 such as a divergent light beam having its propagation axis coincident with the optical axis 90. The solid conical light beam 88 propagates towards the conical reflector 84 that is also centered on the optical axis 90. For example, the light source 82 may comprise a laser and a pinhole for creating the solid conical light beam 88.

The reflector 84 has a conical shape and is positioned so that its apex faces the light source 82. The external face of the reflector 84 that extends from the base of the reflector 84 to its apex comprises first and second annular sections 92 and 94 that are made of a light reflecting material while the remaining of the external face of the reflector 84 is made of a non-reflecting material. It should be understood that in the context of the present embodiment, a light reflecting material is a material that is adapted to reflect at least partially light having the wavelength of the light emitted by the light source 82. Similarly, a non-reflecting material should be understood as a material that substantially does not reflect light having the wavelength of the light emitted by the light source 82. Each annular section 92, 94 extends along a circumference of the conical reflector 84 at a respective distance from the apex of the reflector 84.

The light beam 88 emitted by the light source 82 illuminates at least the first and second reflecting sections 92 and 94 that each reflect the incident light to create the reflected light beams 96 and 98. Each reflected light beam 96, 98 is annular and centered on the optical axis 90. While propagating, the reflected light beam 96, 98 forms a hollow frusto-conical shaped beam of light. The directions of the reflected light beams 96 and 98 are different, i.e. the angles between the reflected light beams 96 and 98 and the optical axis 90 are different. The reflected hollow conical light beams 96 and 98 each have a thickness that depends on the width of the annular sections 92 and 94, respectively.

The divergence angle of the light beam 88, the distance between the light source 82 and the apex of the conical reflector 84, the angle of the conical reflector 84, and the positions of the annular reflecting sections 92 and 94 along the external face of the conical reflector 84 are chosen so that the reflected light beams 96 and 98 each have a predefined opening angle relative to the optical axis 90 and that the predefined opening angles for the reflected light beams 96 and 98 be different.

The reflected light beams 96 and 98 each illuminate a respective portion of the surface 34. The image capture device 86 then images the portions of the surface 34 that are illuminated by the reflected light beams 96 and 98. The 2D profile of the lines illuminated on the surface 34 can then be determined from the determined distance between the surface 34 and the optical axis 90, and the 3D profile of the surface 34 can be determined by moving the profilometer 80 relative to the surface 34.

Figure 5A:
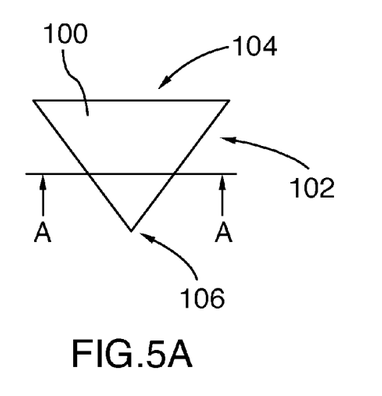
FIG. 5A illustrates a conical light reflector, in accordance with an embodiment.

FIGS. 5A-5D present different embodiments of reflectors that may be used in an optical profilometer. FIG. 5A illustrates a conical reflector 100 having a reflecting face 102 that extends between a base 104 and an apex 106. The cross-section of the reflector 100 along the axis AA, i.e. the cross-section in a plane perpendicular to the optical axis of the profilometer, may have various shapes. For example, the reflector 100 may have a circular cross-sectional shape. In another example, the reflector may have an elliptical cross-sectional shape. In one embodiment and as illustrated in FIG. 1, the whole reflecting face 102 is made of a light reflecting material. In this case, the whole reflecting face 102 is adapted to reflect light having the same wavelength as that of the light emitted by the light source. In another embodiment and as illustrated in FIG. 4, only some annular portions of the lateral face 102 may be made of a light reflecting material while the other sections are non-reflecting.

Figure 5B:
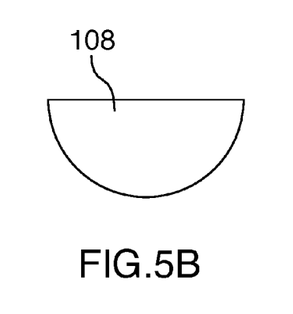
FIG. 5B illustrates a hemi-spherical light reflector, in accordance with an embodiment.

FIG. 5B illustrates one embodiment of a hemi-spherical reflector 108. In this case, the reflecting face of the reflector 108 has a hemi-spherical shape. It should be understood that the whole reflecting face of the reflector 108 may be made of a light reflecting material. Alternatively, only some annular sections of the reflecting face may be made of a light reflecting material.

Figure 5C:
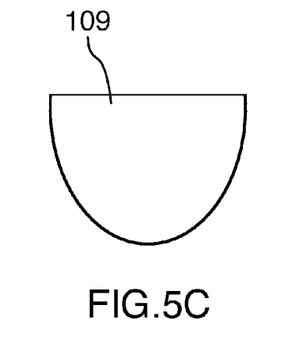
FIG. 5C illustrates a hemi-ellipsoidal light reflector, in accordance with an embodiment.

FIG. 5C illustrates an exemplary hemi-ellipsoidal reflector 109. In this case, the reflecting face of the reflector 109 has a hemi-ellipsoidal shape. It should be understood that the whole reflecting face may be made of a light reflecting material. Alternatively, only some annular sections of the reflecting face may be made of a light reflecting material.

Figure 5D:
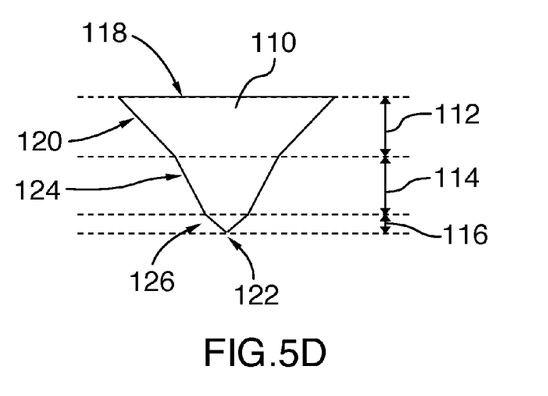
FIG. 5D illustrates a light reflector comprising three conical sections, in accordance with an embodiment.

FIG. 5D illustrates an exemplary conical reflector 110 that comprises three different conical sections 112, 114, and 116. The first section 112 extends from a base 118 of the reflector 110 and has a truncated conical shape. The external reflecting surface 120 of the first section 112 intersects the symmetry axis of the reflector 110 with a first angle. The symmetry axis is orthogonal to the base 118 and passes through the apex 122 of the reflector 110. The second section 114 extends from the first section 112 of the reflector 110 and has a truncated conical shape. The external reflecting surface 124 of the second section 114 intersects the symmetry axis of the reflector 110 with a second angle that is different from the first angle. The third section 116 extends from the second section 114 up to the apex 122 to have a frusto-conical shape. The external reflecting surface 126 of the third section 116 intersects the symmetry axis of the reflector 110 with a third angle that is different from the first and second angles.

The reflector 110 may be used in a profilometer for reflecting three annular light beams generated by a light source in order to obtain three conical beams that open at different angles relative to the optical axis of the profilometer. The first, second, and third sections are each adapted to reflect a respective one of the three annular light beams emitted by the light source. The angles of the first, second, and third sections are chosen so as to provide the three reflected conical light beams with different and predefined opening angles relative to the optical axis of the profilometer. For example, the angle of the first section may be chosen so that the first conical light beam has an opening angle greater than 90°. The angle of the second section may be chosen so that the second conical light beam has an opening angle of about 90° (in this specific case the conical light beam takes the form of a plane of light) while the angle of the third section may be chosen so that the third conical light beam has an opening angle that is less than 90°.

Figure 6:
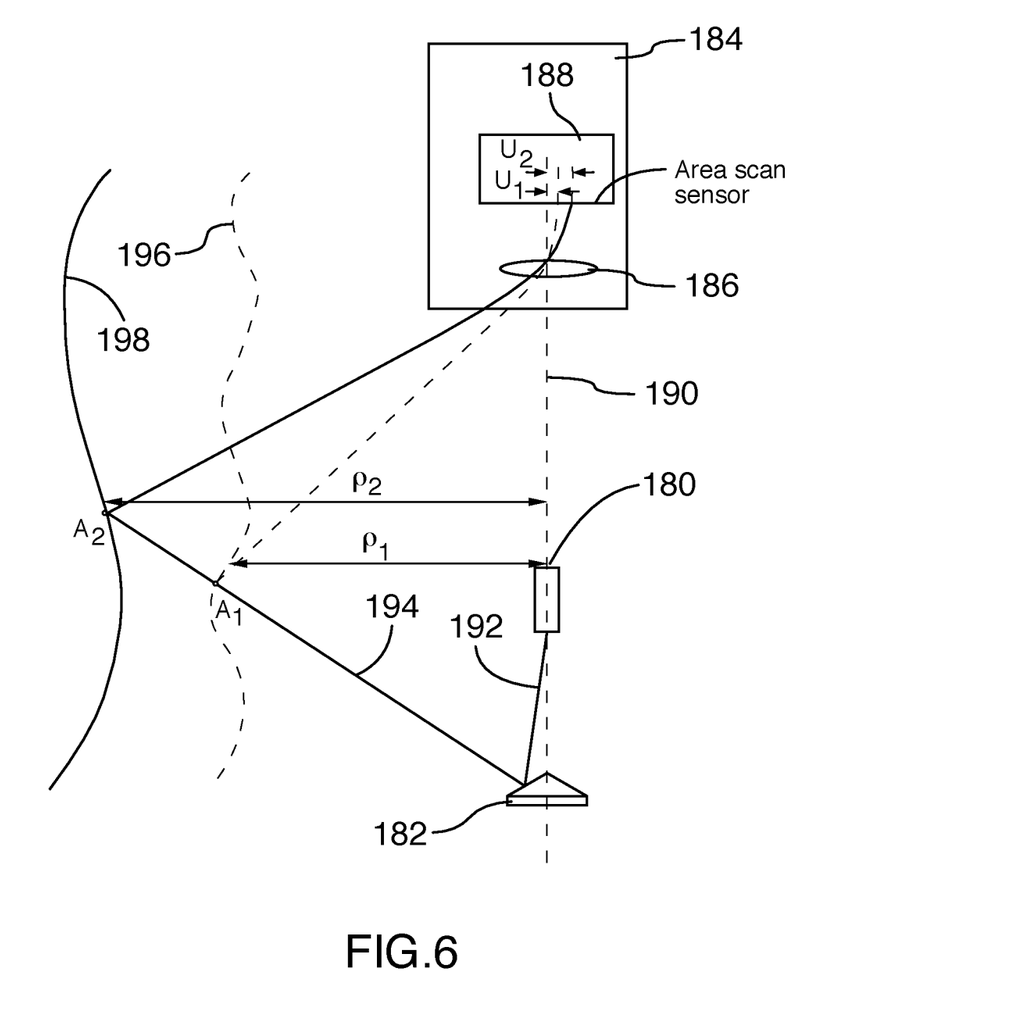
FIG. 6 schematically illustrates the detection of the light reflected by a surface to be imaged, in accordance with an embodiment.

FIG. 6 schematically illustrates the imaging of a surface illuminated by a profilometer. For the sake of clarity, only one ray of light is illustrated in FIG. 6. However, it should be understood that the profilometer of FIG. 6 is adapted to emit at least two hollow conical light beams as with the profilometers of FIGS. 1, 3, and 4. In the embodiment illustrated in FIG. 6, the profilometer comprises a light source 180 adapted to emit at least two hollow conical light beams of which only one ray is illustrated in FIG. 6. The profilometer further comprises a conical reflector 182 and an image capture device 184 comprising an objective lens 186 and an image sensor 188. The light source 180 and the conical reflector 182 are centered on the optical axis 190 so that the hollow conical light beams reflected by the conical reflector 182 be centered on the optical axis 190. Optionally, the image sensor may also be centered on an optical axis 190.

The light source 180 emits a hollow conical light beam 192 that is reflected by the conical reflector 182 to provide the reflected hollow conical light beam 194. The reflected light beam 194 propagates up to the surface to be imaged. The curve 196 illustrates a surface to be imaged that is located at a distance $\rho_1$ from the optical axis 190 while the curve 198 illustrates a second surface to be imaged that is located at a distance $\rho_2$ from the optical axis 190. As illustrated in FIG. 6, the distance $\rho_2$ is longer than the distance $\rho_1$, and both distances are defined within planes that are perpendicular to the optical axis 190. When the profilometer images the surface 196, the light beam 194 illuminates the point $A_1$ of the surface, and a part of the light beam 194 is diffusely reflected by the surface element A1 of the surface 196 towards the objective lens 186. The zone of the image sensor 188 illuminated by the light reflected from the surface element $A_1$ of the surface 196 is located at a distance $U_1$ from the optical axis 190. For example, the image sensor 188 may comprise an array of photosensitive elements (pixels). In this case, the distance $\rho_1$ may be determined from the position of the pixel that is illuminated by the light reflected from the surface element $A_1$. When the profilometer images the surface 198, the light beam 194 illuminates the surface element $A_2$ of the surface 198, and a part of the light beam 194 is diffusely reflected by the surface element $A_2$ of the surface 198 towards the lens 186. The zone of the image sensor 188 illuminated by the light reflected from the surface element $A_2$ of the surface 198 is located at a distance $U_2$ from the optical axis 190. Since the distance $\rho_2$ is greater than the distance $\rho_1$, the distance $U_2$ is also greater than the distance $U_1$. When the image sensor 188 comprises an array of pixels, the distance $\rho_2$ may be determined from the position of the pixel that is illuminated by the light reflected from the surface element $A_2$.

Cylindrical coordinates ($\rho$, $\theta$, z) may be used for determining the positions of the zones of the image sensor 188 that are illuminated. The longitudinal axis is parallel with the optical axis and the origin of the coordinates is a point on the optical axis 190, where $\rho$ is the radial coordinate: the distance between the illuminated point of the surface and the optical axis, $\theta$ is the azimuthal angle, and z is the projection of the illuminated point on the optical axis 190. The position of the origin is arbitrary as long as it is a point on the optical axis 190. The direction of the coordinate z is also arbitrary as long as it is parallel to the optical axis 190. For an embodiment, it might be more practical to fix the origin on the entrance pupil of the objective of the image sensor with the longitudinal axis pointing towards the conical reflector. For another embodiment, it might be more convenient to set the origin at the base of the conical reflector and set the direction of the longitudinal axis towards the image sensor. Those choices don't change the nature of the invention, but only the representation of data.

Taking into account the rotational symmetry of the configuration, it should be understood that the present analysis done for a single ray of light may be applied for all azimuthal orientations.

Figure 7A:
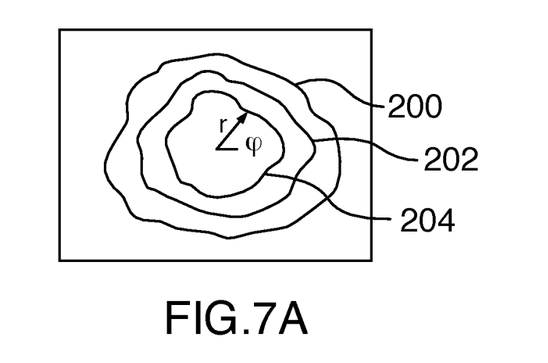
FIG. 7A illustrates three measurement curves resulting from the illumination of a surface by three hollow conical light beams having different opening angles, in accordance with an embodiment.

FIG. 7A schematically illustrates an exemplary image obtained from the image capture device 184 and that shows three closed curves (annular profiles) 200, 202, and 204, each of which corresponding to the reflection of a respective hollow conical light beam by the surface to be imaged. In this case the profilometer is adapted to emit three different hollow conical light beams that have different opening angles and are each reflected by different portions of a surface to be imaged.

Figure 7B:
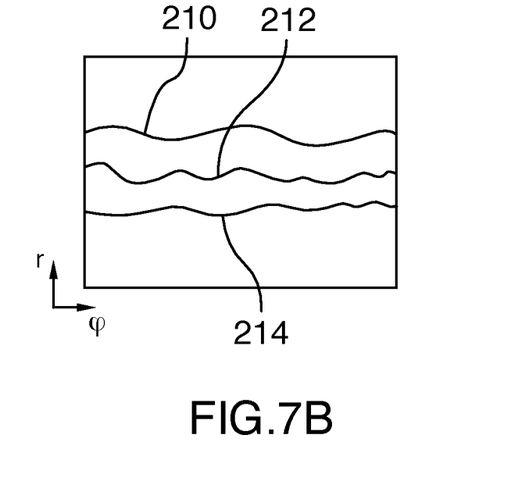
FIG. 7B illustrates three curves presenting a distance between the surface and the optical axis of the profilometer as a function of an azimuthal angle, each curve corresponding to a transform of a respective curve of FIG. 7A, in accordance with an embodiment.

The radius r of each point of each curve 200, 202, and 204, i.e. for each value of the angle $\phi$ for each curve 200, 202, and 204, is then determined. A calibration run can be performed to establish the correspondence (mapping) between the coordinate systems ($\rho$, z, $\theta$) and (r, $\phi$). In one embodiment, the calibration may be parametric. In this case, the system may be modelled by mathematical functions. A computing module receives the images of the illuminated surface from the image capture device 184 and determines a correspondence between the sensor angular coordinate $\phi$, the sensor radial coordinate r, and the spatial coordinates ($\rho$, z, $\theta$). In order to obtain measurements in a reference system external to the profilometer, the computing module receives external information about the positioning of the profilometer and applies an adequate coordinate transform. The external information may come from an encoder that records the position of the profilometer when the latter is moving, or from an inertial sensor. The curves 210, 212, and 214 depicted in FIG. 7B are obtained by applying the coordinate transform to the curves 200, 202, and 204, respectively. Each curve 210, 212, 214 represents the distance measured between the surface of the object and the optical axis as a function of the angle $\phi$, for a specific position of the profilometer relative to the surface.

In one embodiment, the above-described profilometer is static, i.e. the profilometer is fixedly positioned at a given location and may not move. In this case, an object of which a surface is to be imaged is positioned adjacent the profilometer and at least two hollow conical light beams having different opening angles illuminate two different sections of the surface of the object, of which the profile is determined.

In another embodiment, the above-described profilometer may be mobile. For example, the profilometer may be mounted on an elongated member such as a mast or a pole. In another example, the profilometer may be mounted on a mobile platform such as a robotized and motorized platform adapted to move within conduits or ducts.

In one embodiment, the generation of more than one hollow conical light beam by the profilometer allows for obtaining a redundancy of the measurements without moving the profilometer. This redundancy of measurements may be particularly useful when the logistic cost for performing the measurements is important.

In comparison to profilometers emitting a single hollow conical beam, the use of more than one hollow conical beam allows multiplying, for each azimuth direction, the number of measurements by a factor which may be as great as the number of hollow conical beams. In one embodiment in which the profilometer is installed on a motorized platform and is moved along its longitudinal axis, and in comparison to profilometers emitting a single hollow conical beam and installed in a similar manner, the increase of measurement density allows for moving the profilometer faster and thereby decreasing the time required to scan a surface. For example, a motorized platform moving at a speed of 1 m/s and supporting a profilometer emitting a single hollow conical beam and sampling at a rate of 50 Hz provides a longitudinal measurement density of one measurement per 20 mm. In comparison, the same motorized platform moving at a speed of 1 m/s but comprising a profilometer emitting five hollow conical beams each sampling at a rate of 50 Hz will provide an average longitudinal measurement density of five measurements per 20 mm. In one embodiment, the longitudinal measurement sampling will not be uniform but will correspond to an average longitudinal measurement density of one sample per 4 mm. If the target longitudinal measurement sampling rate is one measurement per 20 mm, the profilometer emitting five hollow conical beams may be moved five times faster than the profilometer emitting a single hollow conical beam to achieve the same density. Thus, the increase in measurement density is converted into a decrease of scanning time.

In one embodiment, the redundancy of measurements may also solve the problem of occultation that may occur with a profilometer emitting a single conical beam (for example, a single hollow conical beam having an opening angle of 90°). Occultations occur when locations on the surface are lit by a conical beam but are hidden from the point of view of the image capture device. The occultation problem is usually important for short observation radial distances relative to the distance separating the entrance pupil of the image capture device and the virtual apex of the conical light beam.

In an application where one embodiment of the profilometer is moved along its longitudinal axis, the presence of multiple hollow conical beams with different opening angles provides more occurrences of scanning the same point. Those occurrences will come with a change of point of view of the image capture device. Therefore, the use of more than one hollow conical beam increases the probability that one reflected beam is not hidden from the line of sight of the image capture device.

In an embodiment in which the quality or precision of the positioning of the profilometer relative to the object to be imaged may be limited, the redundancy of the measurements may allow for a partial auto-referencing of the data. For example, the profilometer may be mounted at an end of a telescopic rod of which the variable length or the extension may be measured by an encoder. The position of the profilometer may vary due to the flexion of the rod, which would lead to measurement errors. The redundancy of the measurements may allow for auto-referencing the profilometer in order to correct the errors of the reference system.

Figure 8:
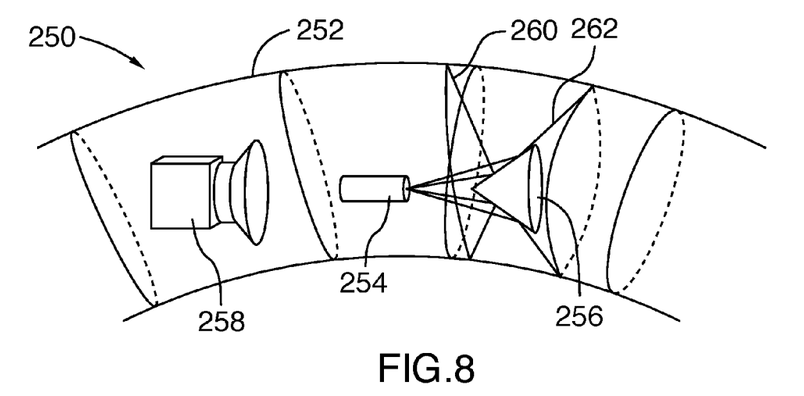
FIG. 8 illustrates a profilometer positioned in a curved section of a duct, in accordance with an embodiment.

In one embodiment, the use of at least two hollow conical light beams allows for an estimation of the curvature of the interior surface of a tubular structure by taking a single measurement, i.e. without moving the profilometer with respect to the tubular structure. Since this estimation is performed in a single measurement, the measurement is not subject to errors coming from erroneous information about the positioning of the profilometer relative to the tubular structure. In an embodiment in which a hollow conical light beam propagates in the forward direction, a single measurement allows for the determination of any change in the direction of the axis of the tubular structure and the determination of the local curvature, as illustrated in FIG. 8. FIG. 8 illustrates a motorized profilometer 250 that is adapted to move within a tubular structure 252. It should be understood that the motorized platform on which the profilometer 250 is mounted is not shown in FIG. 8. The motorized profilometer 250 comprises a light source 254, a light reflector 256, and an image capture device 258, which form a single apparatus, i.e. the profilometer 250. The light source 254 is adapted to emit two hollow conical light beams. The first hollow conical light beam is reflected by the light reflector 256 to provide a backward-oriented hollow conical light beam 260. The second hollow conical light beam is reflected by the light reflector 256 to provide a forward-oriented hollow conical light beam 262. The shape of the images of the forward-oriented hollow conical light beam reflected on the structure 252 may then be used for anticipating any change in the direction of the axis of the tubular structure and the local curvature.

Figure 9:
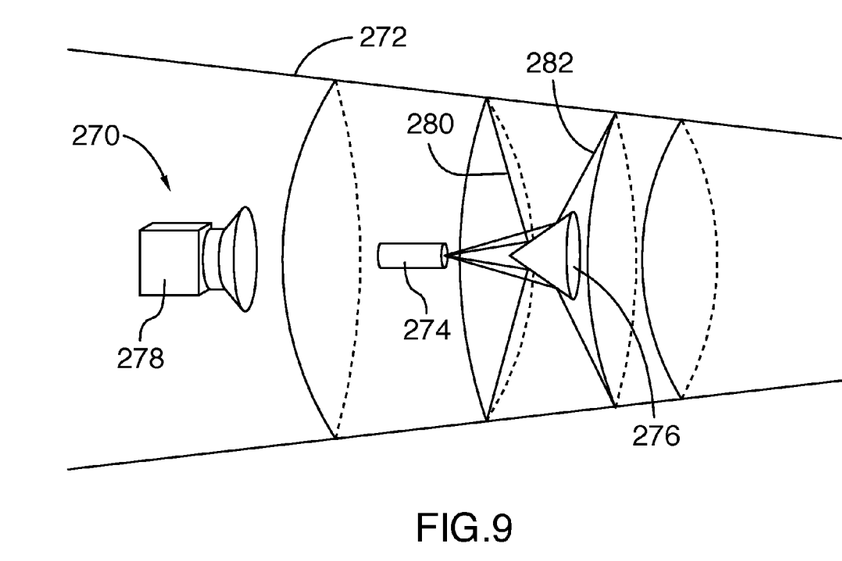
FIG. 9 illustrates a profilometer positioned in a section of a duct having a decreasing diameter, in accordance with an embodiment.

Also in an embodiment in which a hollow conical light beam propagates in the forward direction, a single measurement performed with the profilometer allows for anticipating any change in the inner dimensions (e.g. the diameter) of the tubular structure, as illustrated in FIG. 9. Information such as anticipated changes of the inner dimensions may help navigating the profilometer within a non-mapped or a partially mapped structure. FIG. 9 illustrates a motorized profilometer 270 that is adapted to move within a tubular structure 272 having a section of decreasing diameter. The motorized profilometer 270 comprises a light source 274, a light reflector 276, and an image capture device 278. The light source 274 is adapted to emit two hollow conical light beams. The first hollow conical light beam is reflected by the light reflector 276 to provide a backward-oriented hollow conical light beam 280. The second hollow conical light beam is reflected by the light reflector 276 to provide a forward-oriented hollow conical light beam 282. The shape of the images of the second hollow conical light beam reflected on the structure 272 may be used for anticipating any changes of curvature or of the inner dimensions of the tubular structure 272.

In one embodiment, propagating at least two hollow conical beams in the forward direction allows for detecting obstacles and taking measurements beyond the front end of the profilometer. For example, propagating one of the hollow conical beams in the forward direction and beyond the front end of the profilometer allows for taking measurements up to the extremity of a tubular structure, and without contact of the profilometer with the extremity. Such measurements would not be possible with a profilometer emitting a single hollow conical beam.

While in the above description, the image capture device is centered on the optical axis of the profilometer, it should be understood that other configurations may be possible. In an embodiment in which the image capture device is not centered on the optical axis, the center of the captured images may be determined from the identification of the pixel of the image sensor through which the optical axis passes.

While in the illustrated embodiments the light source is positioned between the image capture device and the light reflector, it should be understood that other configurations are possible. For example, the light reflector may be positioned between the light source and the image capture device while the image capture device is directed towards the illuminated sections of the surface to be imaged and located at an adequate distance from the light reflector so that the light reflector blocks only an unused center portion of the field of view of the image capture device.

The embodiments described above are intended to be exemplary only. The scope of the invention is therefore intended to be limited solely by the appended claims.

The invention claimed is:

1. A system for sensing a surface of an object, comprising:
   a light source for emitting at least two incident hollow conical light beams centered on an optical axis of the system;
   a light reflector for reflecting the at least two incident hollow conical light beams to generate at least two reflected hollow conical light beams centered on the optical axis and having different opening angles, the at least two reflected hollow conical light beams for illuminating the surface; and
   an image capture device for imaging the illuminated surface.

2. The system of claim 1, wherein the light source comprises at least two light emitters each for emitting a respective one of the at least two incident hollow conical light beams.

3. The system of claim 2, wherein the at least two light emitters are aligned and spaced apart one another along the optical axis of the system.

4. The system of claim 2, wherein the at least two light emitters are adapted to emit light at different wavelengths.

5. The system of claim 1, wherein the light source comprises a laser and a diffractive optical element for generating the at least two incident hollow conical light beams.

6. The system of claim 1, wherein the light source comprises a light emitter that emits incoherent light and an opaque mask containing at least two annular apertures for generating the at least two incident hollow conical light beams.

7. The system of claim 1, wherein the light reflector comprises a mirror having a reflecting face, the reflecting face for reflecting the at least two incident hollow conical light beams and thereby generating the at least two reflected hollow conical light beams.

8. The system of claim 7, wherein the mirror has one of a conical shape, a hemi spherical shape, and a hemi-ellipsoidal shape.

9. The system of claim 7, wherein the mirror is made of optical glass coated with a reflecting material.

10. The system of claim 1, wherein the image capture device comprises a complementary metal-oxide-semiconductor (CMOS) image sensor and a fish-eye lens.

11. The system of claim 1, further comprising an optical band-pass filter located in front of the image capture device for filtering ambient light.

12. The system of claim 1, further comprising a computing module connected to the image capture device, the computing module comprising a processing unit and a memory coupled to the processing unit, and the memory comprising statements and instructions stored thereon that, when executed by the processing unit, perform a determination of a distance between the optical axis and the illuminated surface, the distance being determined using a triangulation method.

13. The system of claim 1, wherein the light source is located between the image capture device and the light reflector along the optical axis of the system.

14. The system of claim 1, further comprising a motorized platform for moving the system.

* * * * *